US009830246B2

(12) United States Patent
Astigarraga et al.

(10) Patent No.: US 9,830,246 B2
(45) Date of Patent: Nov. 28, 2017

(54) MANAGEMENT AND CORRELATION OF NETWORK IDENTIFICATION FOR COMMUNICATION ERRORS

(71) Applicant: INTERNATIONAL BUSINESS MACHINES CORPORATION, Armonk, NY (US)

(72) Inventors: Tara Astigarraga, Fairport, NY (US); Michael E. Browne, Staatsburg, NY (US); Louie A. Dickens, Tucson, AZ (US); Laura M. Reid, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 14/307,761

(22) Filed: Jun. 18, 2014

(65) Prior Publication Data

US 2015/0370684 A1    Dec. 24, 2015

(51) Int. Cl.
*G06F 11/00* (2006.01)
*G06F 11/34* (2006.01)
*G06F 11/30* (2006.01)
*G06F 11/07* (2006.01)

(52) U.S. Cl.
CPC ............ *G06F 11/349* (2013.01); *G06F 11/07* (2013.01); *G06F 11/0727* (2013.01); *G06F 11/0775* (2013.01); *G06F 11/3006* (2013.01); *G06F 11/3034* (2013.01); *G06F 11/3051* (2013.01); *G06F 11/3476* (2013.01); *G06F 2201/835* (2013.01)

(58) Field of Classification Search
CPC .................................................. G06F 11/3495
See application file for complete search history.

(56) References Cited

U.S. PATENT DOCUMENTS

| 8,108,454 | B2  |   1/2012 | Snively et al. |
| 8,326,978 | B2  | 12/2012 | Bharadwaj et al. |
| 8,331,544 | B2* | 12/2012 | Kraus ................ G07C 9/00944 340/5.7 |
| 9,203,876 | B2* | 12/2015 | Amber ................ H04L 65/1073 |
| 2003/0193901 | A1* | 10/2003 | Ishibashi ................ H04L 45/02 370/252 |
| 2008/0027567 | A1* |   1/2008 | Philyaw ................ G06F 9/4411 700/40 |
| 2008/0040452 | A1* |   2/2008 | Rao ........................ H04L 1/243 709/219 |
| 2008/0199012 | A1* |   8/2008 | Niinomi .................. G06F 21/78 380/277 |
| 2011/0173504 | A1  |   7/2011 | Kabakura |
| 2012/0099855 | A1  |   4/2012 | Sasso et al. |
| 2012/0173934 | A1  |   7/2012 | Astigarraga et al. |

(Continued)

*Primary Examiner* — Christopher McCarthy
(74) *Attorney, Agent, or Firm* — Griffiths & Seaton PLLC (57) ABSTRACT

Various embodiments for management and correlation of communication errors by a processor device. A log is maintained that records each assignment of a particular network identification (ID) with a specific device in a computer storage network, including at least one of a date the ID was assigned and a time the ID was assigned, such that a trace or review may later be performed to correlate the specific device with data associated with the device at the at least one of the date and the time for troubleshooting purposes.

18 Claims, 4 Drawing Sheets

(56) References Cited

U.S. PATENT DOCUMENTS

| | | | |
|---|---|---|---|
| 2012/0218990 A1 | 8/2012 | Subramanyan et al. | |
| 2014/0064056 A1* | 3/2014 | Sakata | H04L 41/00 370/216 |
| 2014/0188779 A1* | 7/2014 | Sakuraba | G06N 7/005 706/52 |

* cited by examiner

MANAGEMENT AND CORRELATION OF NETWORK IDENTIFICATION FOR COMMUNICATION ERRORS

BACKGROUND OF THE INVENTION

Field of the Invention

The present invention relates to general computing systems, and more particularly to, various embodiments for management and correlation of network identification for communication errors in data storage networks.

Description of the Related Art

Today with modern technology, large volumes of data are storable on disk and flash drives; these drives can exist as a solo entity, or as part of a broader make up within a larger storage environment, such as a computing storage network. As the sheer volume of data in today's information-based society continues to increase, so too does the demands placed on legacy infrastructures such as Fibre Channel and Gigabit Ethernet cabling and other data communications mechanisms.

SUMMARY OF THE INVENTION

Within computer storage networks, determining the source of network issues, such as in a Fibre Channel over Ethernet (FCoE) environment, can become nearly impossible if any link reset operation occurs that causes a new Fibre Channel Identification (FCID) to be assigned to the communications port experiencing the trouble. In most cases, a trace will reveal only one of the FCIDs involved, either the one which experienced the issues or the alternative one that was assigned after the reset occurred.

Since the applicable switch shows only the current FCID and not the previously ones, it is not possible to determine which applicable port is the source of the issues in this scenario. A user performing troubleshooting steps needs to be able to trace a port's FCID both backward and forward within a capture, dump or log review to accurately determine the source of a potential problem. Currently, there is no mechanism that allows the user to view the history of FCID assignments on a port/switch, and a need exists for such a mechanism.

Accordingly and in view of the foregoing, to address the challenges previously described, various embodiments for management and correlation of communication error logs, dumps and traces by a processor device in a computing storage network are provided. In one such embodiment, by way of example only, a method for management and correlation of communication error logs and traces is provided. A log is maintained that records each assignment of a particular network identification (ID) with a specific device in a computer storage network, including at least one of a date the ID was assigned and a time the ID was assigned, such that a trace or review may later be performed to correlate the specific device with data associated with the device at the given date and the time for troubleshooting purposes.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is an additional flow chart diagram of an additional exemplary method for management and correlation of communications errors in a computer storage network in which aspects of the present invention may be implemented; specifically FIG. 4 illustrates exemplary mechanisms for monitoring, managing, and recording events in the computer storage network for use in subsequent debugging.

DETAILED DESCRIPTION OF THE DRAWINGS

As previously mentioned, within computer storage networks, determining the source of network issues, such as in a Fibre Channel over Ethernet (FCoE) environment, can become nearly impossible if any link reset operation occurs that causes a new Fibre Channel Identification (FCID) to be assigned to the communications port experiencing the trouble. In most cases, a trace, dump or logs will reveal only one of the FCIDs involved, either the one that experienced the issues or the alternative one that was assigned after the reset occurred.

Since the applicable switch shows only the current FCID and not the previously ones, it is not possible to determine which applicable port is the source of the issues in this manner. A user performing troubleshooting steps needs to be able to trace a port's FCID both backward and forward within a capture to accurately determine the source of a potential problem. Currently, there is no mechanism that allows the user to view the history of FCID assignments on a port/switch, and a need exists for such a mechanism.

Accordingly and in view of the foregoing, to address the challenges previously described, various embodiments for management and correlation of communication error logs, dumps and traces by a processor device in a computing storage network are provided. In one such embodiment, by way of example only, a log is maintained that records each assignment of a particular network identification (ID) (such as an FCID) with a specific device in a computer storage network, including at least one of a date the ID was assigned and a time the ID was assigned, such that a trace or review may later be performed to correlate the specific device with data associated with the device at the at least one of the date and the time for troubleshooting purposes. In addition to an FCID, the network ID may include other IDs such as an eNode Media Access Control (MAC) address, an IP address, and the like.

The mechanisms of the illustrated embodiments implement methodologies for tracking network IDs such that they are tied to specific devices in the computer storage network, such as a given initiator/target or virtual initiator/target on a switch. In this manner if a problem arises in the storage environment that needs to be traced back to a certain device at a particular date and/or time, the data may then be correlated. In addition, the information tying the network IDs with the devices can be implemented in further functionality as will be described. Thus, the mechanisms of the illustrated embodiments allow for dramatic improvements in the manner in which troubleshooting network errors is performed, as well as allow for trending the error data to provide a more detailed look into the storage network among other functionality.

Figure 1:
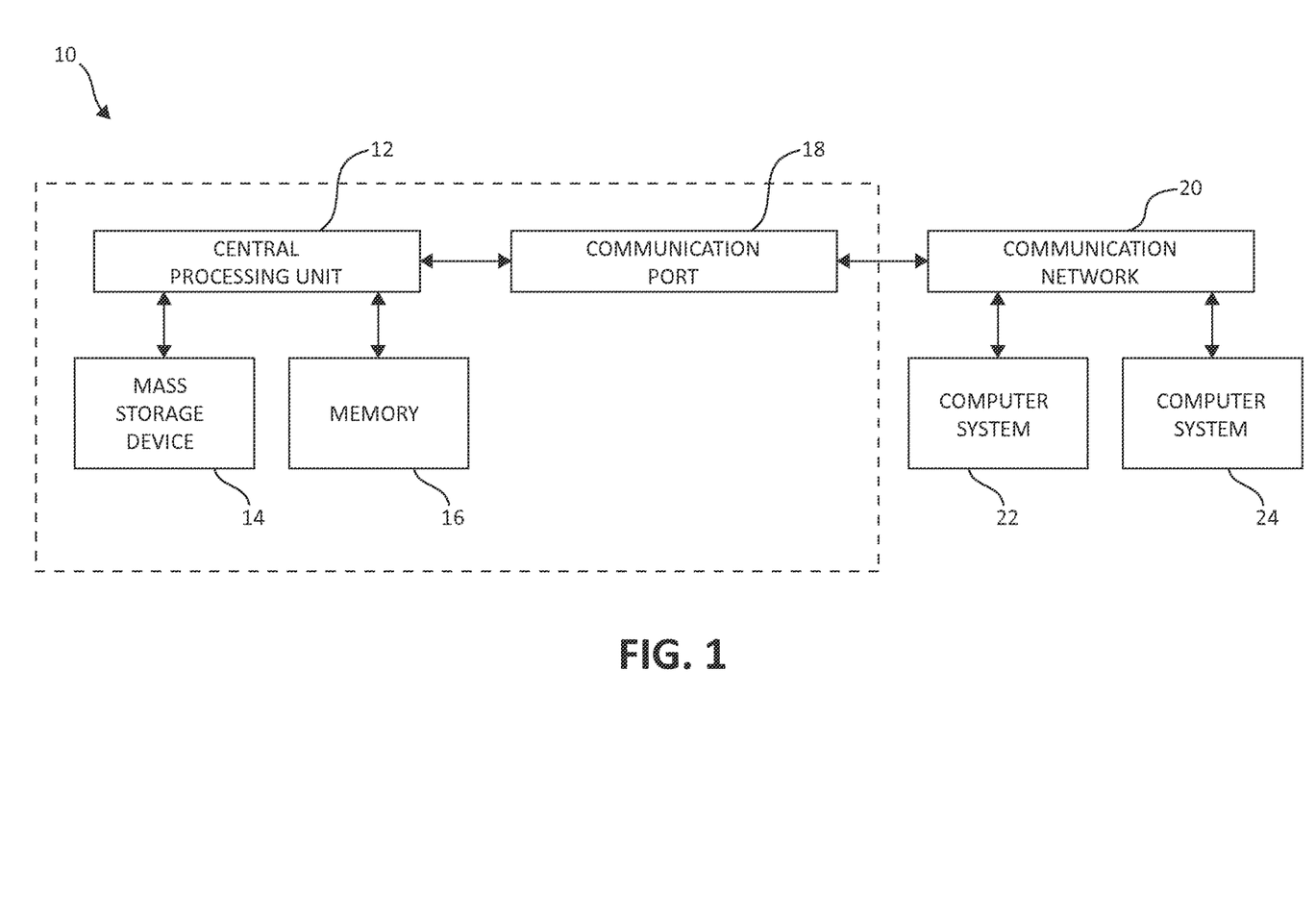
FIG. 1 is a block diagram showing an exemplary hardware structure for effecting management and correlation of communication errors, in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
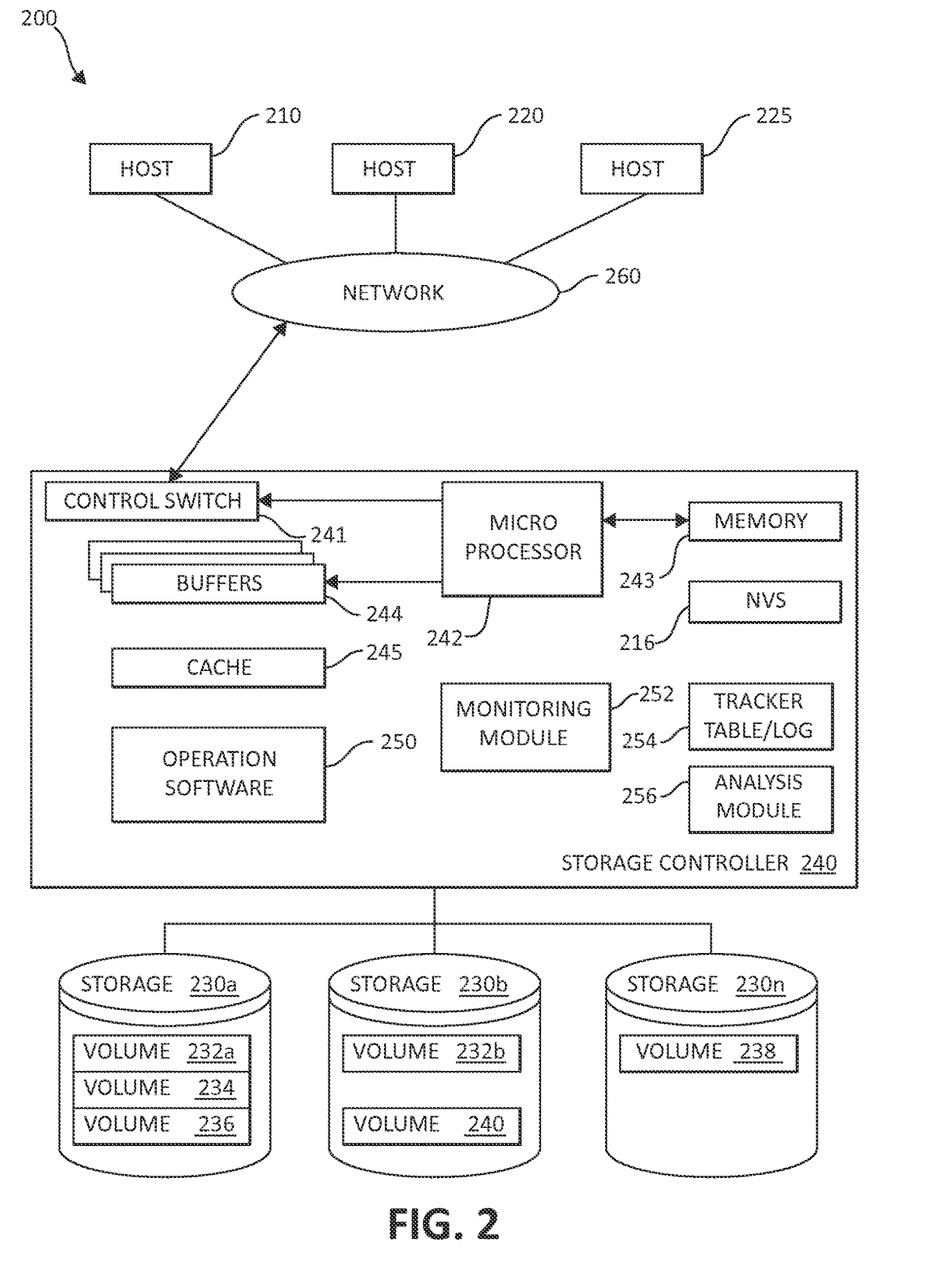
FIG. 2 is an additional block diagram of an additional exemplary hardware structure, specifically portions of a computer storage network, again in which aspects of the present invention may be realized.

FIG. 2 is an exemplary block diagram 200 showing a hardware structure of a data storage and management system (specifically, portions of a SAN 200) that may be used in the overall context of performing multipath I/O management in accordance with the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes and other network components known to one of ordinary skill in the art.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260. While one data connection between components (such as between storage 230 and storage controller 240, and network connection 260 and cluster hosts 210, 220, and 225) is shown for purposes of brevity, one of ordinary skill in the art will appreciate that a number of network connections, or "paths" may be found in a particular system or scenario in which data is transferred. These paths form the multipath architecture of storage networks in which the mechanisms of the present invention are concerned, among other aspects.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include operation software 250, a monitoring module 252, a tracker table/log 254, and an analysis module 256. The operation software 250, monitoring module 252, analysis module 256, and tracker table/log 254 may work in conjunction with each and every component of the storage controller 240, the hosts 210, 220, 225, and storage devices 230. The operation software 250, monitoring module 252, analysis module 256, and tracker table/log 254 may be structurally one complete module or may be associated and/or included with other individual modules. The operation software 250, monitoring module 252, tracker table/log 254 and analysis module 256 may also be located in the cache 245 or other components of portion 200.

The operation software 250, monitoring module 252, tracker table/log 254 and analysis module 256 may indi-vidually and/or collectively perform various aspects of the present invention as will be further described. For example, the operation software 250 may contain executable code for performing error management functionality. The exchange-module 252 may implement one or more monitoring processes that monitor the computer storage network for events such as FLOGIs and FDISCs. The tracker table/log 254 may include records of assignments of network IDs to specific devices in the computer storage network. The analysis module 256 may analyze the activity across the computer storage network and correlate potential issues with information from the tracker table/log 254. In addition, the analysis module may trend data with help from information from the tracker table/log 254.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the base-block generation module 257, the audio waveform module 258, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

As previously mentioned, the mechanisms of the illustrated embodiments include, for example, mechanisms that track the history of network IDs, such as eNode MACs, FCIDs, IP addresses, and the like assigned to specific devices in the computer storage network. In one embodiment, these mechanisms track the history of eNode MACS and/or FCIDs assigned to a given initiator/target or virtual initiator/target on a switch.

In one embodiment, the mechanisms maintain, for example, a detailed log of which network IDs belong/belonged to which hosts based on World Wide Port Name (WWPN), at specific dates and/or times. In this manner, if a problem arises in the computer storage environment and needs to be traced back to a specific device at a certain date/time, the data may be correlated.

In addition to the foregoing, the mechanisms not only use this information to establish a reference table of information, but implement this information dynamically to assist in troubleshooting, diagnosis, and debugging potential problems, for example. For example, methodologies may be used to apply the information in the log to switch logs/dump operations. Methodologies may be applied to a dump operation, for example, that for every instance of a FCID or eNode MAC described in the log having a failing symptom during a specified time period, the table could add a descriptor to the log/dump with the associated host information. This addition may dramatically change the way debugging operations are performed and could assist to point at specific hosts having problems in the storage environment even as eNode MACs and/or FCIDs are changed.

In one embodiment of the present invention, if a port undergoes any action that causes it to be assigned a new FCID, the switch shall create a record of the old FCID, and the new FCID that can be shown, displayed, or queried for on the switch.

Figure 3:
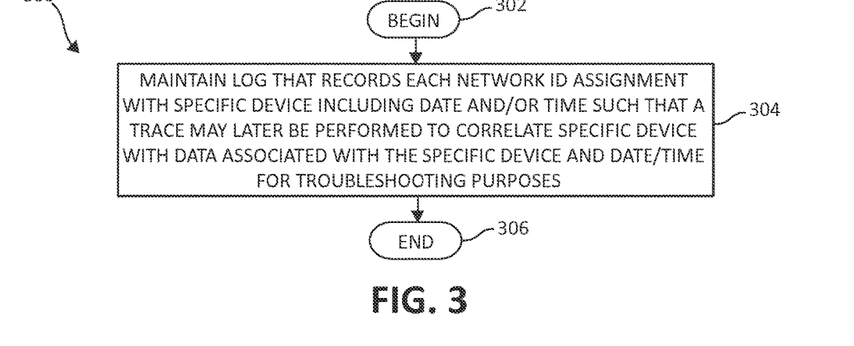
FIG. 3 is a flow chart diagram of an exemplary method for management and correlation of communication errors in a computer storage network, here again in which aspects of the present invention may be implemented.

Turning now to FIG. 3, an exemplary method for effecting error management functionality in a computer storage network according to various aspects of the illustrated embodiments, is depicted as method 300. Method 300 begins (step 302) with the maintenance of a log that records each network ID assignment with a specific network device, including such information as a respective date and/or time that the device was assigned, such that a trace or review may later be performed to correlate the specific device with data associated with the specific device and the date/time for troubleshooting purposes (step 304). The method 300 then ends (step 306).

Figure 4:
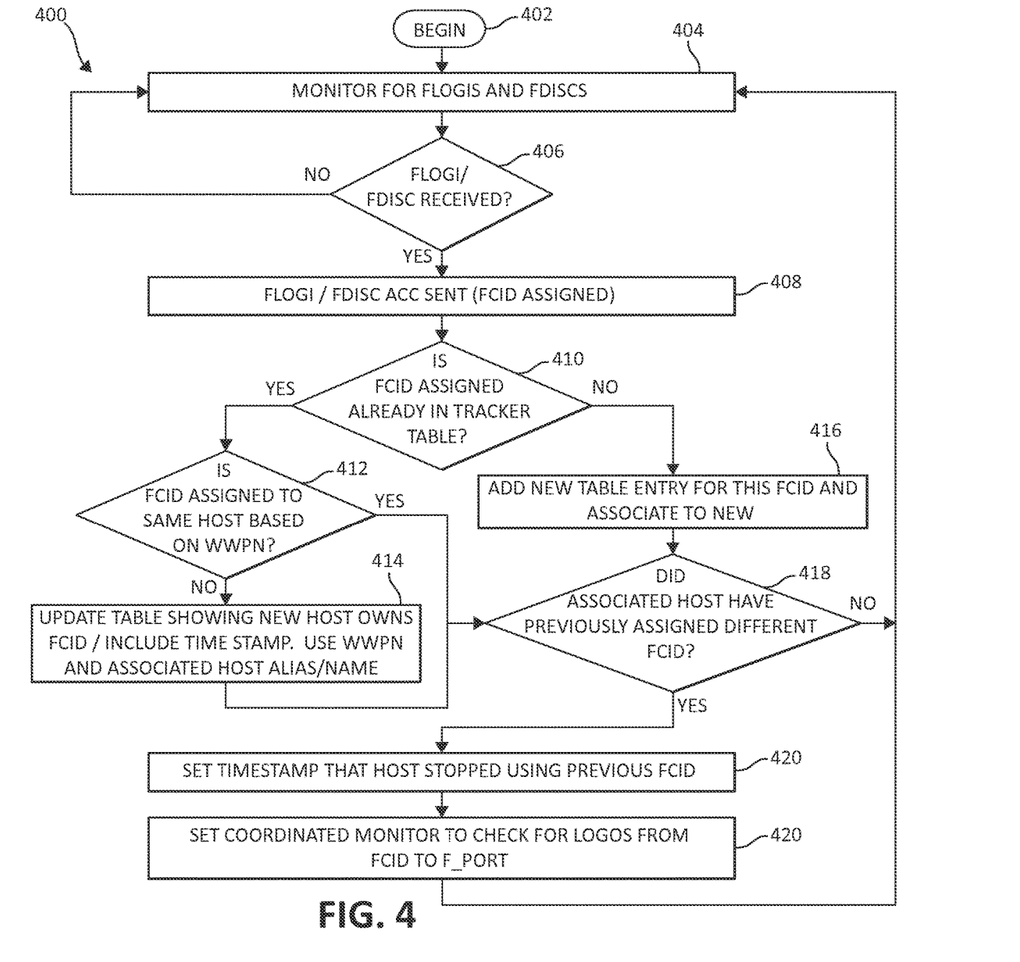

FIG. 4, following, illustrates an additional exemplary method for effecting management and correlation of errors in a computer storage network in accordance with various aspects of the illustrated embodiments as method 400. Method 400 begins (step 402) by monitoring the computer storage network for fabric logins (FLOGIs) and/or discover fabric service parameter (FDISC) operations (step 404). If a FLOGI/FDISC is received, the method continues to step 406, following. Alternatively, the method 400 continues to monitor for network events.

Once a FLOGI/FDISC is received, a FLOGI/FDISC accept (ACC) message is sent, and the FCID is assigned by the network (step 408). In the following decision step 410, the method 400 queries if the FCID assigned is already located in the tracker table/log (step 410). If so, the method 400 moves to step 412, which then queries if the FCID is assigned to the same host based on the applicable WWPN. Returning to step 410, if the FCID assigned is not already located in the tracker table/log, the method 400 moves to step 416 as will be described below.

Returning to step 412, if the FCID is assigned to the same host based on the applicable WWPN, the method 400 moves to step 418, which then queries if the associated host had previously assigned a differing FCID. If not, the method returns to step 404 to continue to monitor for FLOGI/FDISC events. Returning again to step 412, if the FCID is not assigned to the same host based on the WWPN, then the tracker table is updated, showing that the new host owns the FCID, including date and time stamp information. The WWPN and associated host alias/name is used (step 414). The method 400 then moves to 418.

Returning again to 418, if the associated host has a previously assigned differing FCID, then the method 400 moves to step 420, which sets the timestamp that the host stopped using the previous FCID (i.e., when the host was assigned the new FCID). In an optional step, to obtain a more accurate time stamp for when a particular host stopped using a particular FCID, a coordinated monitor may also be set to look for a Fibre Channel over Ethernet Initialization Protocol (FIP) logout (LOGO) message from a respective FCID to an F_Port (step 422). The method 400 then returns to step 404 to continue monitoring for FLOGIs and FDISCs as described previously.

In an additional embodiment, the mechanisms and flow described above may be altered to accommodate the identification and correlation of eNODE MAC addresses by using the aforementioned FIP Discovery Protocol in lieu of monitoring for FLOGI events, as one of ordinary skill in the art will appreciate.

Once the information identifying the network ID assignments/time stamp/dates is recorded in the tracker table/log, this data may then be cross-reference with switch logs/dumps. For example, for every error log instance that cites a particular FCID, a tag in the log may be added that cross references the particular log entry to the specific host (again based on WWPN) that held that FCID during the time of failure. In addition, this data may be trended at this point to show how many of the log errors may be related to certain hosts, for example.

Figure 5:
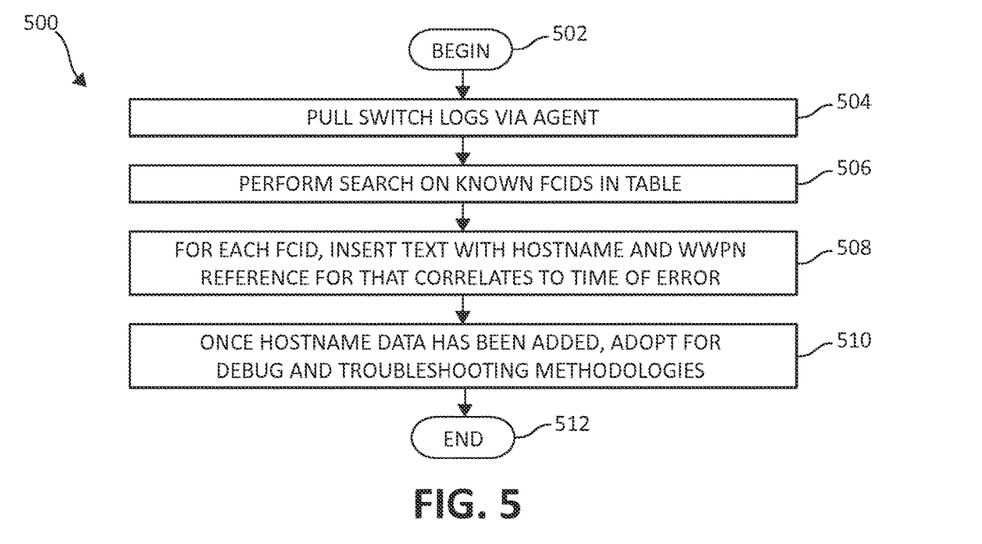
FIG. 5 is an additional flow chart diagram of an additional exemplary method for management and correlation of communications errors in a computer storage network; specifically mechanisms for managing switch logs/dumps and trending correlated data; here again in which aspects of the present invention may be implemented.

FIG. 5, following, illustrates an exemplary method 500 for effecting error management and correlation integrating these aforementioned ideas in one embodiment. Method 500 begins (step 502) by obtaining switch logs via an agent. A search may then be performed on known FCIDs in the tracker table/log (step 504). For each FCID hit, text may be inserted with a particular hostname and WWPN reference for that correlates to the time of the error (step 506). Once the hostname data has been added, it may be used in a multitude of ways for increased debug and understanding of environment failures, and for example, how these failures and other errors map back to certain host systems (step 508). The method 500 then ends (step 510).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for management and correlation of communication errors by a processor device, comprising:
   maintaining a log that records each assignment, including all previous assignments, of a particular network identification (ID) of a given port with a specific device in a computer storage network, including a date the ID was assigned and a time the ID was assigned, such that one of a trace and a review may later be performed to correlate the specific device with data associated with the device at the date and the time for troubleshooting purposes; and
   using information in the log during a switch log/dump operation such that if the specific device is determined to exhibit a failing symptom during a specified time, a portion of the information relating to the specific device is used as a descriptor to the log/dump for subsequent troubleshooting.

2. The method of claim 1, wherein maintaining the log further includes recording one of an eNode Media Access Control (MAC) address and a Fibre Channel Identification (FCID) assignable to one of an initiator/target and a virtual initiator/target on a switch.

3. The method of claim 1, wherein maintaining the log further includes using a World Wide Port Name (WWPN) to associate the ID with the specific device.

4. The method of claim 3, wherein the specific device is a host, and further including associating the ID with the host using the WWPN.

5. The method of claim 1, further including monitoring the computer storage network for at least one of a fabric login (FLOGI) and a discover fabric service parameters (FDISC) initiated in the computer storage network.

6. The method of claim 1, further including collecting information to be recorded in the log using a Fibre Channel over Ethernet Initiation Protocol (FIP).

7. A system for management and correlation of communication errors in a computer storage network, comprising:
   a processor device, operable in the computer storage network, that maintains a log that records each assignment, including all previous assignments, of a particular network identification (ID) of a given port with a specific device in the computer storage network, including a date the ID was assigned and a time the ID was assigned, such that one of a trace and a review may later be performed to correlate the specific device with data associated with the device at the date and the time for troubleshooting purposes, and
   uses information in the log during a switch log/dump operation such that if the specific device is determined to exhibit a failing symptom during a specified time, a portion of the information relating to the specific device is used as a descriptor to the log/dump for subsequent troubleshooting.

8. The system of claim 7, wherein the processor device, pursuant to maintaining the log, records one of an eNode Media Access Control (MAC) address and a Fibre Channel Identification (FCID) assignable to one of an initiator/target and a virtual initiator/target on a switch.

9. The system of claim 7, wherein the processor device, pursuant to maintaining the log, uses a World Wide Port Name (WWPN) to associate the ID with the specific device.

10. The system of claim 9, wherein the specific device is a host, and further wherein the processor device associates the ID with the host using the WWPN.

11. The system of claim 10, wherein the processor device monitors the computer storage network for a fabric login (FLOGI) and a discover fabric service parameters (FDISC) initiated in the computer storage network.

12. The system of claim 7, wherein the processor device collects information to be recorded in the log using a Fibre Channel over Ethernet Initiation Protocol (FIP).

13. A computer program product for management and correlation of communication errors by a processor device, the computer program product comprising a non-transitory computer-readable storage medium having computer-readable program code portions stored therein, the computer-readable program code portions comprising:

a first executable portion that maintains a log that records each assignment, including all previous assignments, of a particular network identification (ID) of a given port with a specific device in the computer storage network, including a date the ID was assigned and a time the ID was assigned, such that one of a trace and a review may later be performed to correlate the specific device with data associated with the device at the date and the time for troubleshooting purposes; and uses information in the log during a switch log/dump operation such that if the specific device is determined to exhibit a failing symptom during a specified time, a portion of the information relating to the specific device is used as a descriptor to the log/dump for subsequent troubleshooting.

14. The computer program product of claim 13, further including a second executable portion that, pursuant to maintaining the log, records one of an eNode Media Access Control (MAC) address and a Fibre Channel Identification (FCID) assignable to one of an initiator/target and a virtual initiator/target on a switch.

15. The computer program product of claim 13, further including a second executable portion that, pursuant to maintaining the log, uses a World Wide Port Name (WWPN) to associate the ID with the specific device.

16. The computer program product of claim 15, wherein the specific device is a host, and further including a third executable portion that associates the ID with the host using the WWPN.

17. The computer program product of claim 13, further including a second executable portion that monitors the computer storage network for a fabric login (FLOGI) and a discover fabric service parameters (FDISC) initiated in the computer storage network.

18. The computer program product of claim 13, further including a second executable portion that collects information to be recorded in the log using a Fibre Channel over Ethernet Initiation Protocol (FIP).

* * * * *